(12) United States Patent
Shea et al.

(10) Patent No.: US 11,760,191 B2
(45) Date of Patent: Sep. 19, 2023

(54) VEHICLE FRONT END MODULE

(71) Applicant: NISSAN NORTH AMERICA, INC., Franklin, TN (US)

(72) Inventors: Daniel Shea, Farmington Hills, MI (US); Sean Cavanaugh, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/246,078

(22) Filed: Apr. 30, 2021

(65) Prior Publication Data
US 2022/0348071 A1 Nov. 3, 2022

(51) Int. Cl.
*B60K 11/04* (2006.01)
(52) U.S. Cl.
CPC .................... *B60K 11/04* (2013.01)
(58) Field of Classification Search
CPC ................. B60K 11/04; F01P 11/10
See application file for complete search history.

(56) References Cited

U.S. PATENT DOCUMENTS

| | | | | |
|---|---|---|---|---|
| 5,671,803 | A * | 9/1997 | Tepas | F28F 9/002 165/41 |
| 2001/0050160 | A1* | 12/2001 | Ozawa | B60Q 1/0433 165/140 |
| 2011/0127005 | A1* | 6/2011 | Keerl | F01P 3/18 29/401.1 |
| 2012/0043051 | A1* | 2/2012 | Kurokawa | B60K 11/04 165/41 |
| 2017/0334283 | A1* | 11/2017 | Haussmann | F01P 3/18 |
| 2022/0016971 | A1* | 1/2022 | Merz | B60K 11/04 |

FOREIGN PATENT DOCUMENTS

| | | |
|---|---|---|
| EP | 2423024 A1 | 2/2012 |
| EP | 2481620 A2 | 8/2012 |
| JP | 2005104212 A | 4/2005 |
| JP | 2007192462 A * | 8/2007 |
| JP | 2007245858 A | 9/2007 |
| WO | WO-9958828 A1 * | 11/1999 ............. B60K 11/04 |

\* cited by examiner

*Primary Examiner* — Hung Q Nguyen
(74) *Attorney, Agent, or Firm* — Global IP Counselors, LLP

(57) ABSTRACT

A vehicle front end module includes a radiator unit, a heat exchanger unit and a splash shield assembly. The heat exchanger unit is disposed in a vehicle forward direction of the radiator unit. The splash shield assembly is disposed in the vehicle forward direction of the radiator unit so that the splash shield is located between the heat exchanger and radiator unit.

20 Claims, 9 Drawing Sheets

VEHICLE FRONT END MODULE

BACKGROUND

Technical Field

The present disclosure generally relates to a vehicle front end module. More specifically, the present disclosure relates to a vehicle front end module for a heating, ventilation and air conditioning (HVAC) system of a vehicle.

Background Information

Front end module heat exchangers perform most efficiently when large quantities of air can be used to remove heat from the fluid inside the heat exchangers. Front end modules heat exchangers include radiators, condensers, transmission oil coolers, etc. The radiator fluid (coolant), the condenser fluid (refrigerant), and transmission oil cooler fluid (transmission oil) become hot during vehicle operation. Air entering the vehicle grill can cool the heat exchanges and the fluid inside the heat exchangers. In addition, these heat exchangers are subjected to extreme environments related to heat, cold, water, etc. Heat exchangers work best when they are protected from harsh conditions.

SUMMARY

In view of the state of the known technology, one aspect of the present disclosure is to provide a vehicle front end module comprising a radiator unit, a heat exchanger unit and a splash shield assembly. The heat exchanger unit is disposed in a vehicle forward direction of the radiator unit. The splash shield assembly is disposed in the vehicle forward direction of the radiator unit so that the splash shield is located between the heat exchanger and radiator unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
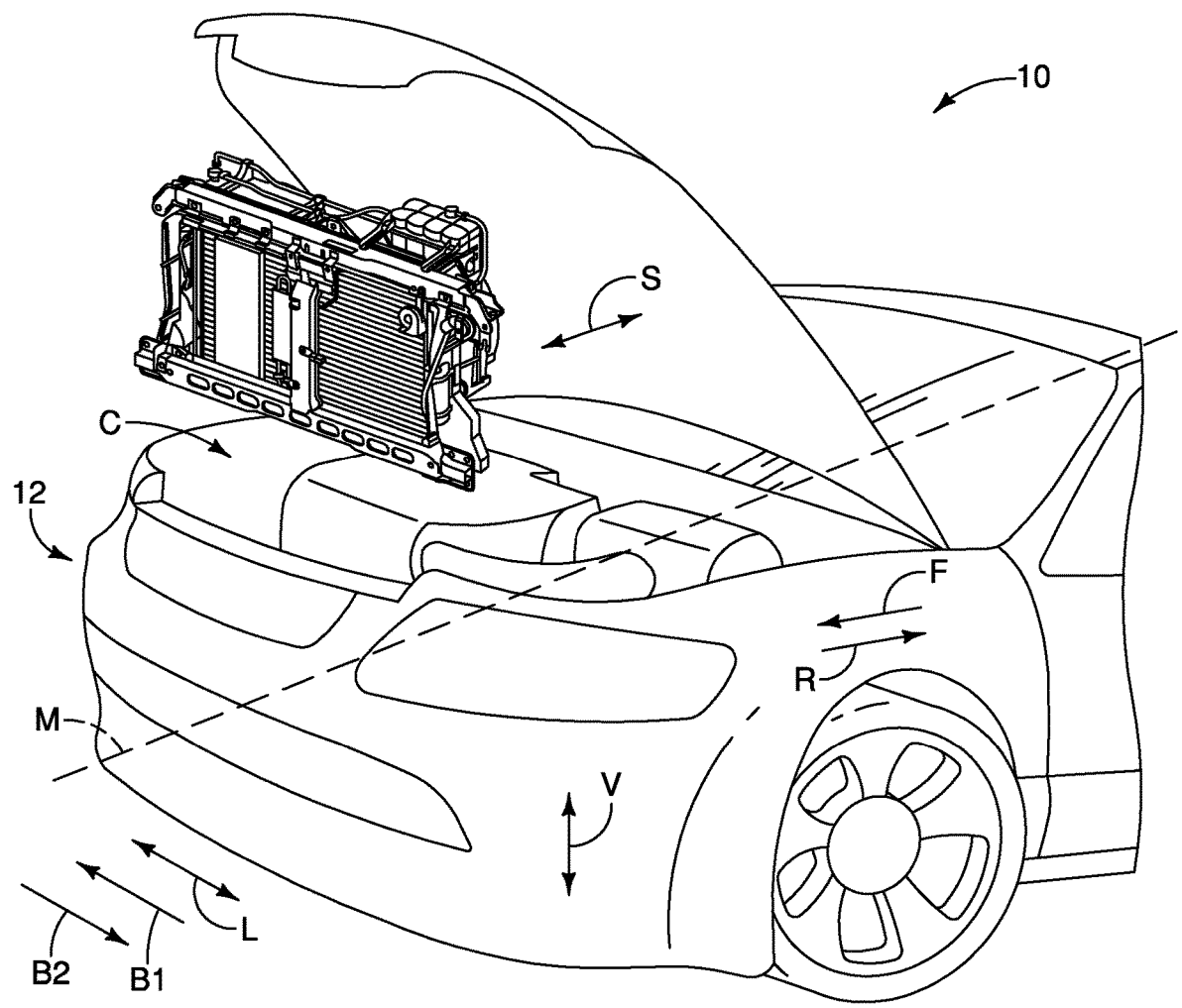
FIG. 1 is a perspective view of a vehicle equipped with a conventional vehicle front end module.

Referring initially to FIG. 1, a vehicle 10 is illustrated as including a conventional front end module (FEM). FEMs can include one or more heat exchanger units H for heating and/or cooling various components of the vehicle 10. As shown, the front end module FEM is fixed to the body structure of a vehicle front end 12 and is located in front of the vehicle engine compartment C. The front end module (FEM) is primarily provided to the vehicle 10 for intaking air from the environment and cooling the fluid in the heat exchangers, as will be further discussed below. The vehicle 10 is illustrated as a sedan. However, the vehicle 10 can include other types of automobiles such as a truck, a sports utility vehicle, a van, etc.

Figure 2:
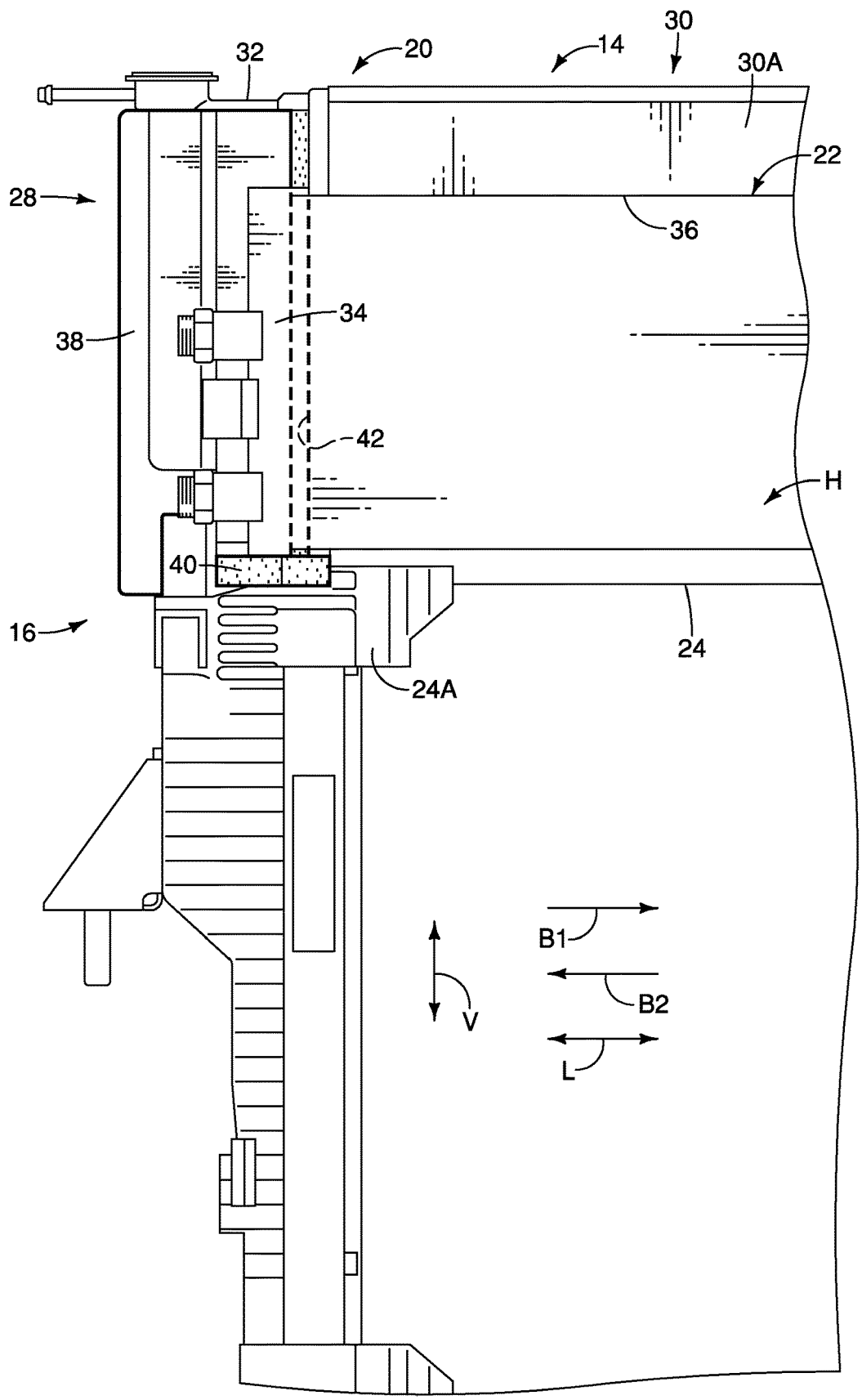
FIG. 2 is a portion of a vehicle front end module in accordance with an illustrated embodiment.

Referring to FIG. 2, a portion of a front end module 14 that can be implemented with the vehicle 10 of FIG. 1 is illustrated in accordance with an illustrated embodiment. In particular, the front end module 14 comprises one or more front end module structures 16 that can include, for example, a fan 18, a radiator unit 20 and a heat exchanger unit H. In the illustrated embodiment, the heat exchanger unit H includes a transmission cooler 22. That is, the transmission cooler 22 is considered a heat exchanger of the front end module 14. The front end module 14 additionally includes a condenser unit 24 that can also be considered a heat exchanger of the front end module 14. Therefore, the front end module 14 includes heat exchangers such as the transmission cooler 22 and the condenser unit 24.

Therefore, the fan 18, the radiator unit 20, the heat exchanger units H and the attachment structures, can all be considered front end module structures 16 of the illustrated embodiment. In the illustrated embodiment, the transmission cooler 22 and the condenser unit 24 are also considered front end module structures 16 of the front end module 14.

Figure 3:
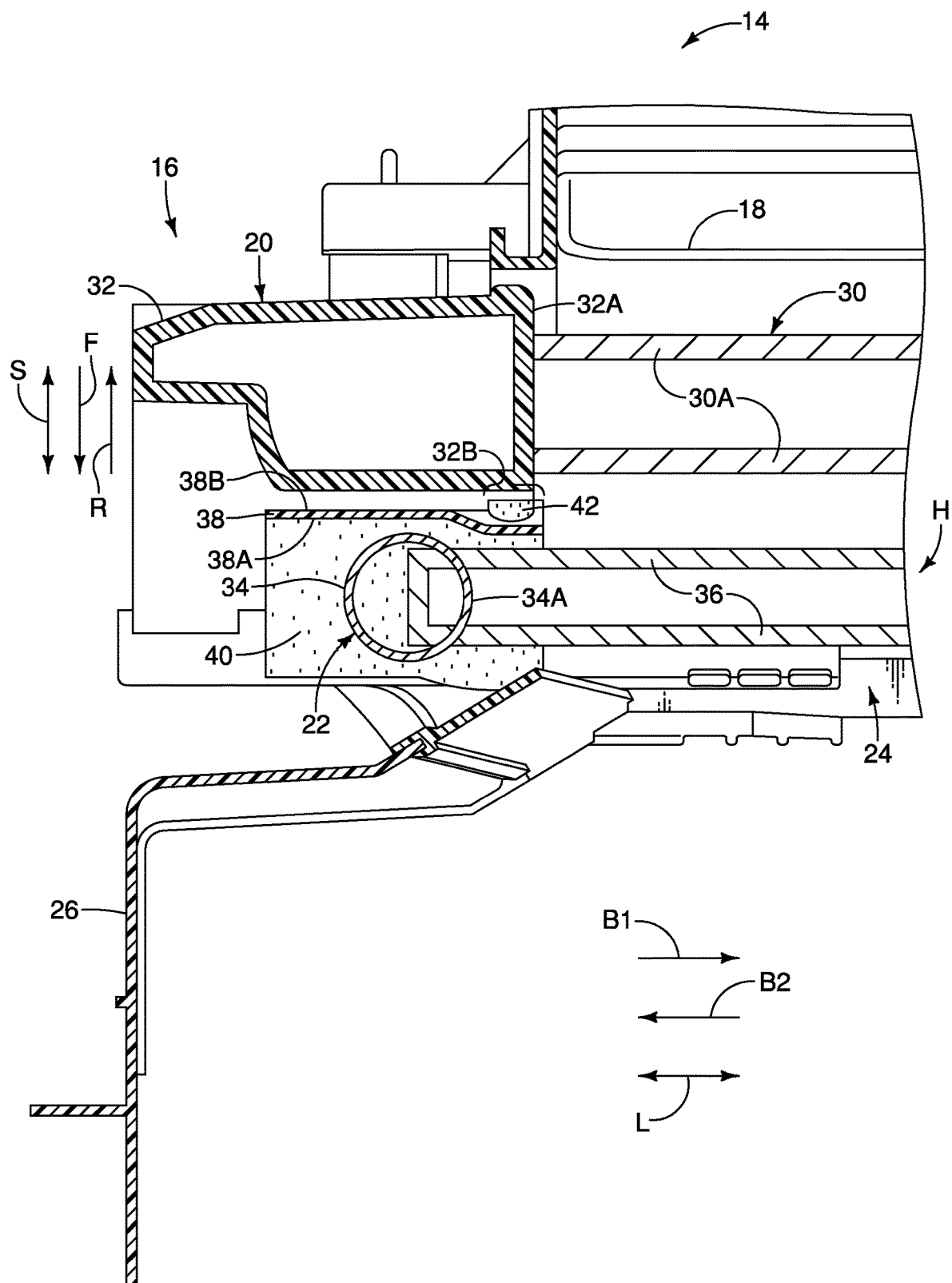
FIG. 3 is a cross-sectional view of the vehicle front end module taken along line 3-3 of FIG. 5.

As seen in FIG. 2, the front end module 14 can further include any mounting or attachment frames (e.g., a condenser attachment bracket 24A shown) for supporting the front end module structures 16 together. As seen in FIG. 3, the front end module 14 can additionally include air guides 26 for directing air received from the vehicle front end 12 rearward through the front end module structures 16. The air guide 26 is typically a rigid structure made of plastic that is disposed primarily forward of the radiator unit 20.

The air guide 26 is typically supported to a front bumper of the vehicle 10 either directly or indirectly to direct air that is received through the vehicle's 10 grille openings into the engine compartment C. The air guide 26 preferably directs air from the vehicle front end 12 rearward through fins of the radiator unit 20. Preferably, the air guide 26 also directs air received from the grille openings through the transmission cooler 22 and the condenser unit 24. In the illustrated embodiment, the vehicle front end 12 module further comprises a splash shield assembly 28 that is supported to the front end module structures 16 of the front end module 14, which will be further described below.

The front end module 14 is part of a temperature control system of the vehicle 10 for maintaining a desired temperature of the vehicle's 10 interior components and passenger cabin, such as to prevent the engine from overheating. For example, the condenser unit 24 is part of the heating, ventilation and air conditioning (HVAC) system of the vehicle 10. The condenser unit 24 intakes warm or hot air out of passenger compartment where it is cooled by the refrigerant of the condenser unit 24, illustrated in FIGS. 2, 6 and 7. The cooler air is then recirculating to the passenger compartment through the HVAC.

Figure 4:
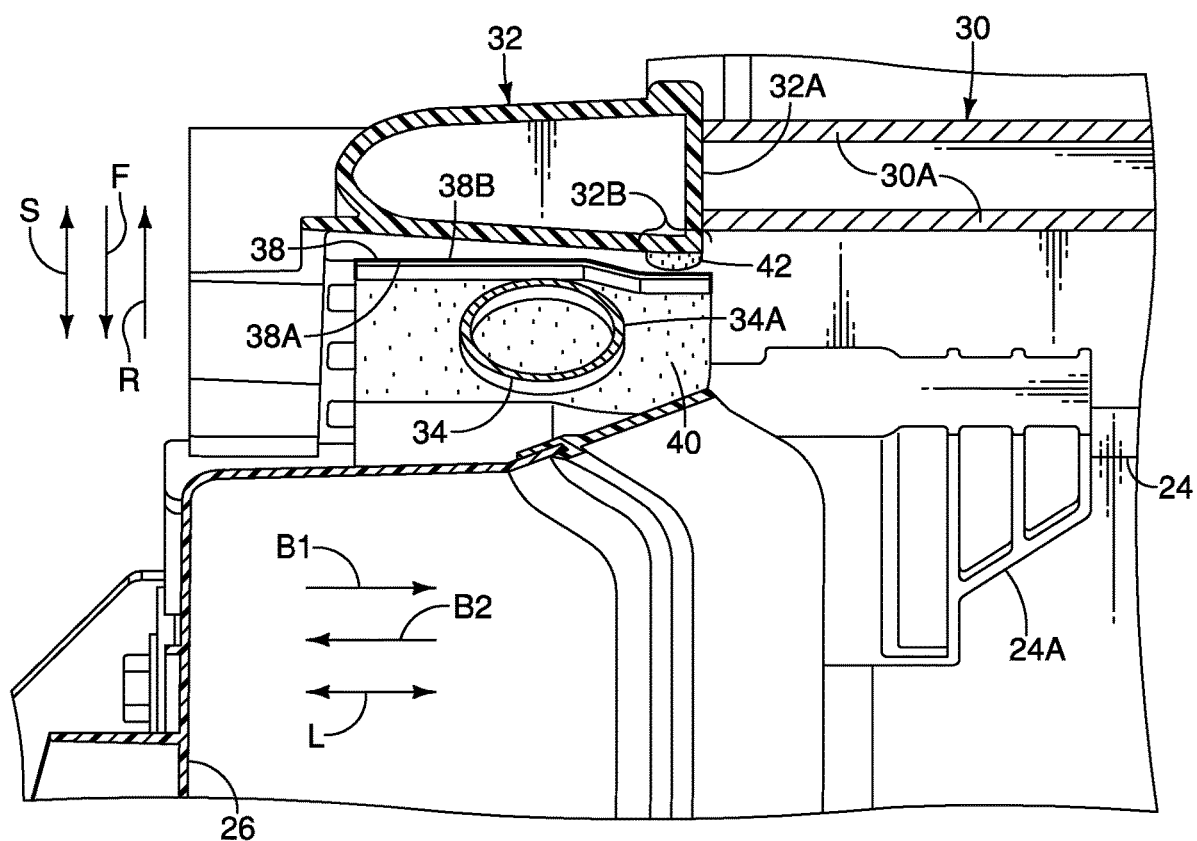
FIG. 4 is a cross-sectional view of the vehicle front end module taken along lines 4-4 of FIG. 5.
Figure 5:
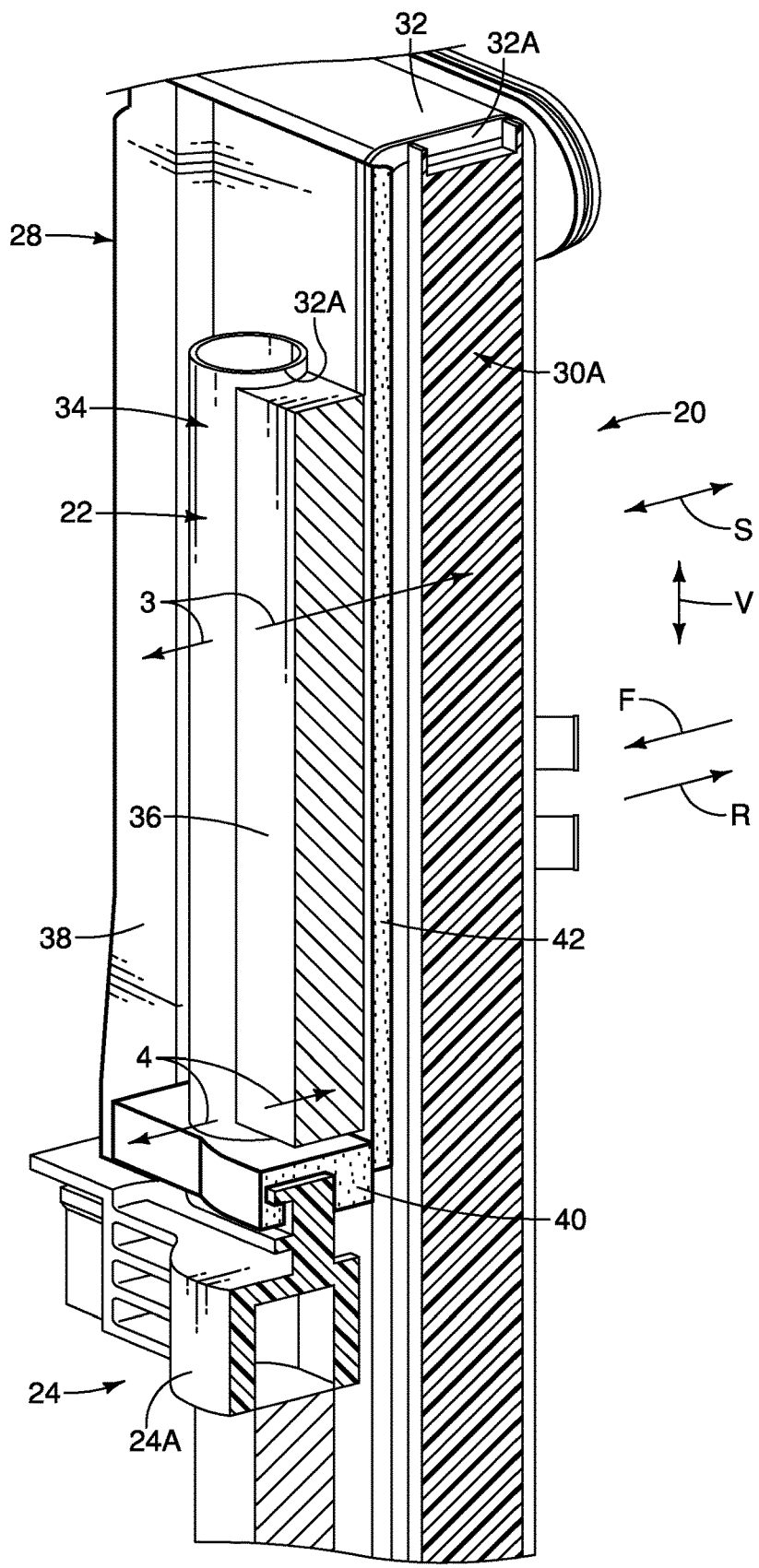
FIG. 5 is a perspective view of a portion of the vehicle front end module.

Referring to FIGS. 3 to 5, the radiator unit 20 cools the vehicle's 10 engine by receiving and cooling hot liquid from the engine. As shown, the radiator unit 20 has a radiator core 30 and a pair of radiator tanks 32 disposed on opposite lateral sides of the radiator core 30 (one radiator tank 32 shown in the Figures). Therefore, the radiator unit 20 includes a radiator tank 32 that is typically made of plastic, or alternatively made of metal. The radiator core 30 is comprised of many small tubes (not shown) that can be equipped with a honeycomb of radiator fins 30A to dissipate heat rapidly. The radiator fins 30A are made of metal, such as brazed aluminum. Fluid flows between the interior of the radiator tanks 32 and the interior of the radiator core 30 where the fluid is cooled.

As shown in FIGS. 3 to 5, the transmission cooler 22 is disposed in a vehicle forward direction F with respect to the radiator unit 20. In the illustrated embodiment, the "forward direction F" refers to a direction that is towards the vehicle front end 12, as shown in FIG. 1. In the illustrated embodiment, the "rearward direction R" refers to a direction that is towards the vehicle's 10 rear that is a direction opposite of the forward direction F. The transmission cooler 22 is positioned at a location in front of the radiator unit 20. That is, the transmission cooler 22 is disposed closer to the vehicle front end 12 than the radiator unit 20 is disposed to the vehicle front end 12.

Figure 6:
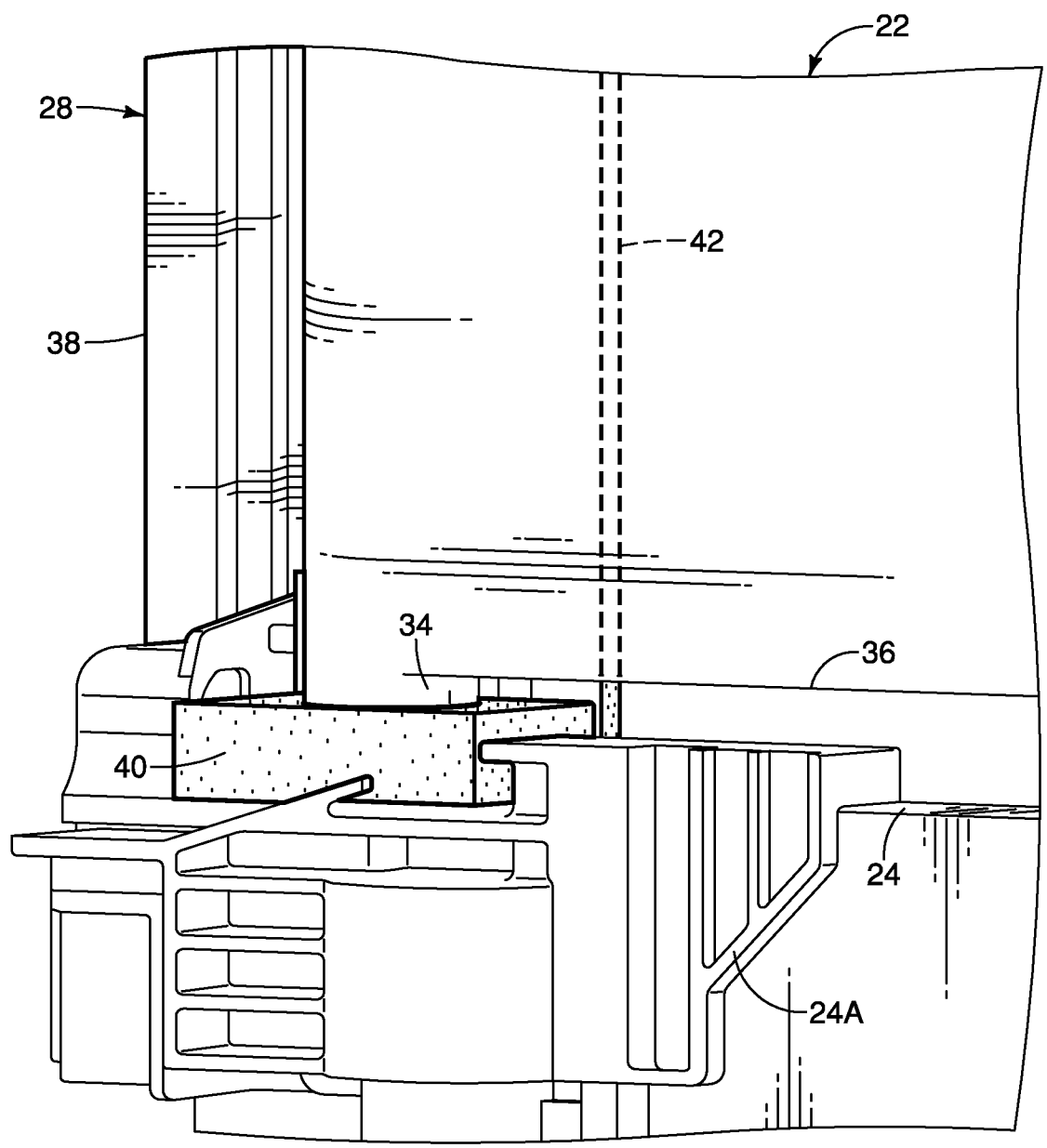
FIG. 6 is an enlarged view of the vehicle front end module of FIG. 3.
Figure 7:
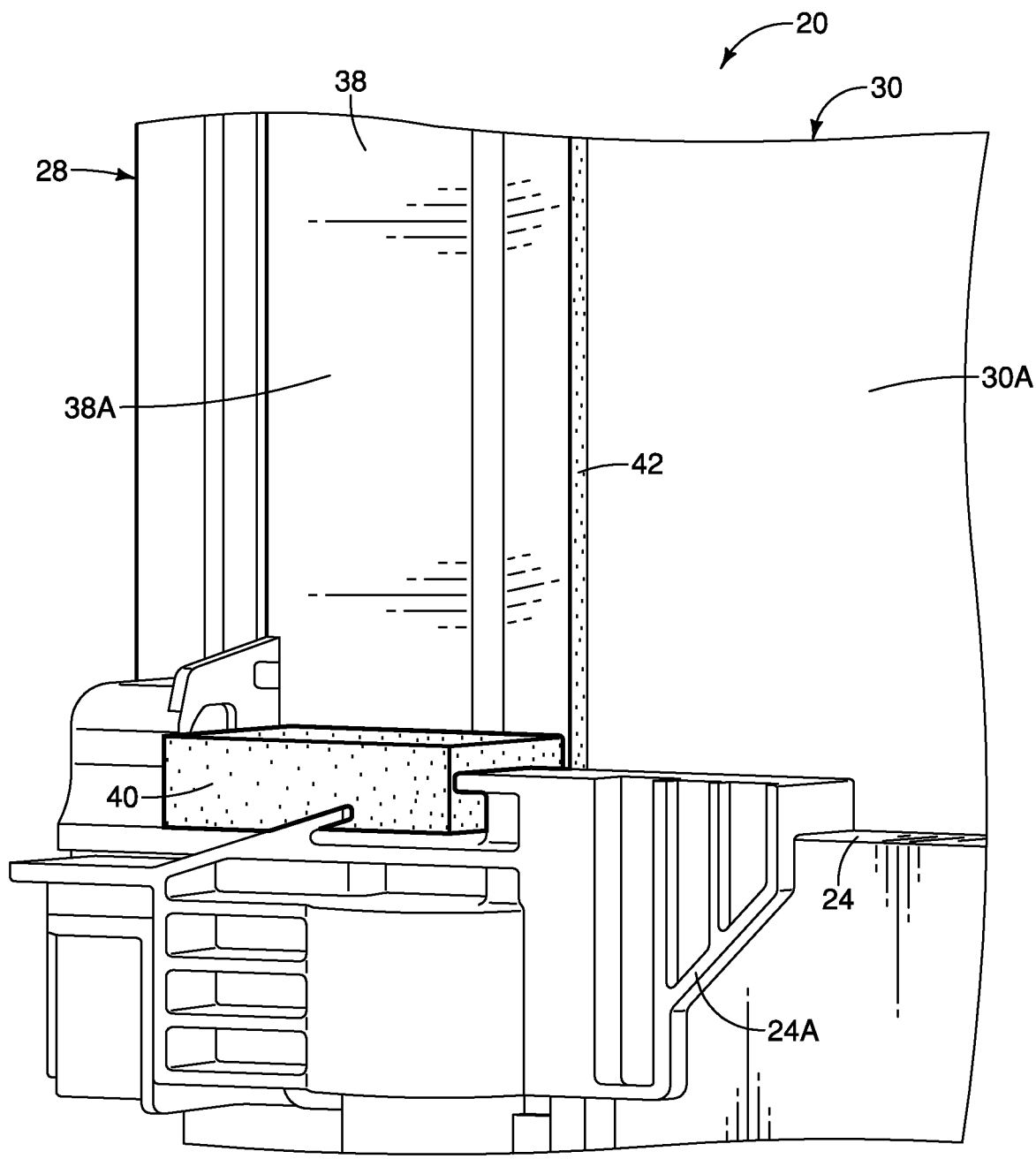
FIG. 7 is another enlarged view of the vehicle front end module of FIG. 3 with a transmission cooler removed.

Referring to FIG. 3, the disposition of the transmission cooler 22 with respect to the radiator unit 20 and the fan 18 can be considered a stacking direction S of the front end module 14. That is, the transmission cooler 22 can be considered stacked to the radiator unit 20 in the forward direction F of the radiator unit 20. The radiator unit 20 is stacked to the fan 18 in the forward direction F of the fan 18. As best shown in FIGS. 3 to 6, the transmission cooler 22 is disposed adjacent to and above the condenser unit 24. Therefore, the transmission cooler 22 is positioned at the effective frontal area of the front end module 14. As best seen in FIGS. 5 to 7, the condenser unit 24 is disposed in the vehicle forward direction F with respect to the radiator unit 20. That is, the condenser unit 24 is stacked with respect to the radiator unit 20 in the vehicle forward direction F.

As seen in FIGS. 3 and 4, the transmission cooler 22 includes a cooler tank 34 and a plurality of cooler fins 36. In the illustrated embodiment, the cooler tank 34 of the transmission cooler 22 is considered a heat exchanger tank of the front end module 14. Therefore, in the illustrated embodiment, the heat exchanger unit H has the heat exchanger tank (e.g., the cooler tank 34). The cooler fins 36 can utilize a plate-and-fin structure in which the cooler fins 36 are stacked between oil channels to transfer heat from the transmission oil in order to cool the transmission oil. The transmission cooler 22 uses air to cool the transmission oil.

As best seen in FIGS. 3 and 4, in the illustrated embodiment, the radiator tank 32 has an inboard edge 32A that defines an end point of the radiator tank 32 that faces towards the vehicle's center midline M with respect to the rest of the radiator tank 32. The inboard edge 32A of the radiator tank 32 is attached to the radiator fins 30A and radiator coolant channels (not shown). The cooler tank 34 has an inboard edge 34A that defines an end point of the cooler tank 34 that faces the vehicle's center midline M with respect to the rest of the cooler tank 34. The inboard edge 34A of the cooler tank 34 is attached to the cooler fins 36 and oil channels (not shown) of the transmission cooler 22. In the illustrated embodiment, the term "inboard" refers to a direction B1 towards the center midline M of the vehicle 10 as shown in FIG. 1. The term "outboard" refers to a direction B2 away from the center midline M and towards the vehicle's lateral ends. The term "lateral" refers to a direction L that is transverse to the center midline M of the vehicle, as shown in FIG. 1.

In the illustrated embodiment, the inboard edge 32A of the radiator tank 32 is positioned closer to the center midline M than the inboard edge 34A of the cooler tank 34 is positioned to the center midline M. The inboard edge 32A of the radiator tank 32 is more inboard than the inboard edge 34A of the cooler tank 34. That is, the inboard edge 32A of the radiator tank 32 and the inboard edge 34A of the cooler tank 34 are laterally offset (not aligned) with respect to each other. Therefore, in the illustrated embodiment, the radiator tank 32 and the cooler tank 34 are laterally offset in the lateral direction L with respect to each other. Alternatively speaking, in the illustrated embodiment, the inboard edge 34A of the cooler tank 34 is positioned outboard (closer to the vehicle's lateral side) with respect to the inboard edge 32A of the radiator tank 32.

As best shown in FIGS. 3 and 4, the radiator tank 32 has an inboard portion 32B that includes the inboard edge 32A and includes the area of the radiator tank 32 that is directly adjacent to and in the vicinity of the inboard edge 32A. The inboard portion 32B of the radiator tank 32 defines the portion of the radiator tank 32 that extends further inboard with respect to the inboard edge 34A of the cooler tank 34.

As stated, the vehicle front end 12 module further comprises the splash shield assembly 28. In the illustrated embodiment, as shown in FIGS. 2 to 5, the splash shield assembly 28 is illustrated as being primarily supported to the radiator unit 20. As shown the splash shield assembly 28 is also supported to the condenser unit 24. In particular, the splash shield assembly 28 is supported to a bracket 24A of the condenser unit 24. It will be apparent to those skilled in the vehicle field from this disclosure that the splash shield assembly 28 can be supported to various ones the front end module structures 16 in a variety of ways and configurations as needed and/or desired.

As shown in FIGS. 3 to 5, the splash shield assembly 28 is disposed between the radiator unit 20 and the transmission cooler 22 in the stacking direction S of the vehicle front end 12 module. In particular, the splash shield assembly 28 is primarily disposed between the radiator tank 32 and the cooler tank 34. Alternatively speaking, the splash shield assembly 28 is sandwiched between the radiator tank 32 and the cooler tank 34 in the stacking direction S of the front end module structures 16.

It has been discovered that the radiator tank 32 can experience wear or discoloration near the inboard edge of the radiator tank 32. In particular, the inboard portion 32B of the radiator tank 32 is subject to wear or discoloration. Wear or discoloration can be caused by liquid from the road splashing onto the radiator tank 32. Road liquid can pass though the grille of the vehicle 10, through the transmission oil cooler fins 36 and contact the radiator tank 32. Wear can lead to objectionable appearance and possible noise vibration and harshness (NVH) issues.

Therefore, the splash shield assembly 28 is provided to cover the inboard portion 32B of the radiator tank 32 to protect the radiator tank 32 from unwanted contact with road liquid. In particular, the splash shield assembly 28 is disposed in the vehicle forward direction F of the radiator unit 20 so that the splash shield is located between the transmission cooler 22 and radiator unit 20. In this way, the splash shield assembly 28 protects the radiator unit 20 from splash coming from the vehicle forward direction F from the transmission cooler 22. As best seen in FIGS. 3 and 4, the splash shield assembly 28 is supported to the radiator unit 20 at the inboard portion 32B of the radiator unit 20 that is laterally offset of the cooler tank 34. In the illustrated embodiment, the splash shield assembly 28 contacts the radiator unit 20, the cooler tank 34 and the cooler fins 36, as will be further described below.

Referring to FIGS. 3, 5 and 6 to 8, the splash shield assembly 28 includes a substrate 38 that is supported to the radiator unit 20. For example, the substrate 38 is attached to a tab on the radiator tank 32 and can be secured to the radiator tank 32 by fasteners (e.g., screws bolts, clips, etc.). As shown in FIG. 2, the substrate 38 is further fastened the condenser unit 24 by fasteners (e.g., screws, bolts, clips, etc.). It will be apparent to those skilled in the vehicle field from this disclosure that the substrate 38 can be supported to the front end module structures 16 by a variety of means and methods.

Figure 8:
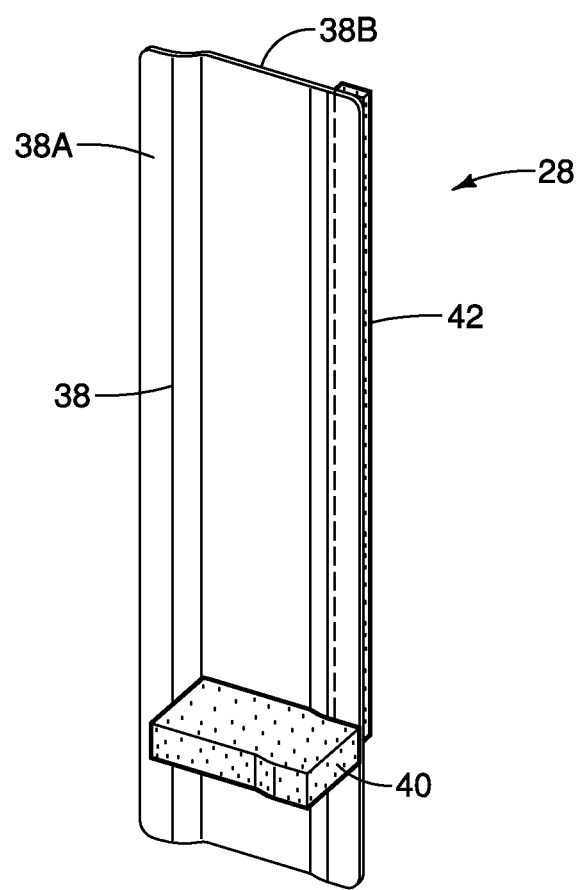
FIG. 8 is a splash shield assembly of the vehicle front end module.

The substrate 38 is a rigid main body of the splash shield assembly 28 that is preferably made of molded plastic. Therefore, in the illustrated embodiment, the substrate 38 includes plastic. As best seen in FIG. 8, the substrate 38 includes a vehicle forward side 38A and a vehicle rearward side 38B. The vehicle forward side 38A faces towards the vehicle front end 12 when the splash shield assembly 28 is assembled to the radiator unit 20. The vehicle rearward side 38B faces towards the vehicle's 10 rear when the splash shield assembly 28 is assembled to the radiator unit 20.

As best seen in FIGS. 3 and 5, the substrate 38 contacts the radiator unit 20 and the transmission cooler 22. The substrate 38 is disposed between the radiator tank 32 and the transmission cooler 22 in the stacking direction S to protect the radiator tank 32 from splash from the vehicle forward direction F. As best seen in FIG. 5, the substrate 38 contacts the radiator unit 20 along a vertical direction V of the radiator unit 20. Preferably, a top of the substrate 38 is substantially aligned with a top of the radiator tank 32. As best seen in FIGS. 5 and 6, a bottom of the substrate 38 is substantially aligned with a bottom of the cooler tank 34. Therefore, in the illustrated embodiment, a vertical height of the substrate 38 approximately corresponds with a vertical height of the transmission cooler 22. A lateral width of the substrate 38 approximately corresponds with a lateral width of the radiator tank 32.

In the illustrated embodiment, the splash shield assembly 28 further includes a stopper supported to the substrate 38. The stopper is a first stopper 40 and the splash shield assembly 28 further includes a second stopper 42 that is supported to the substrate 38. Therefore, the splash shield assembly 28 includes the pair of first and second stoppers 40 and 42.

The first and second stoppers 40 and 42 are seals that are designed to prevent road liquid from contacting the radiator tank 32. The first and second stoppers 40 and 42 can be either rigid or deformable. The first and second stoppers 40 and 42 can include foam that are die cut. The first and second stoppers 40 and 42 can alternatively include rubber, such as ethylene propylene diene monomer rubber. The first and second stoppers 40 and 42 can alternatively include plastic that are integrally formed with the substrate 38. It will be apparent to those skilled in the vehicle field from this disclosure that the first and second stoppers 40 and 42 can include a combination of foam, rubber and/or plastic to serve as seals that prevent leakage into the radiator tank 32.

In the illustrated embodiment, the first stopper 40 is supported to the substrate 38 at the vehicle forward side 38A of the substrate 38. The first stopper 40 contacts the transmission cooler 22. The first stopper 40 does not contact the radiator unit 20 as the substrate 38 is sandwiched between the first stopper 40 and the radiator unit 20. Therefore, the first stopper 40 contacts at least one of the radiator unit 20 and the transmission cooler 22. In particular, the first stopper 40 contacts the cooler tank 34. As best seen in FIG. 5, a bottom of the cooler tank 34 "sits" on the first stopper 40. The first stopper 40 contacts a bottom of the cooler tank 34. Therefore, the first stopper 40 contacts the bottom of the heat exchanger unit H. The cooler tank 34 is disposed above the first stopper 40. As best seen in FIG. 5, the first stopper 40 does not contact the cooler fins 36 because accumulation of road fluid and/or debris in the first stopper 40 would corrode the cooler fins 36.

In the illustrated embodiment, as seen in FIGS. 2 and 5 to 7, the first stopper 40 is disposed vertically between the transmission cooler 22 and the condenser unit 24. In particular, the first stopper 40 is disposed vertically between the cooler tank 34 and the bracket 24A of the condenser unit 24. The first stopper 40 serves as a seal in a gap between the transmission cooler 22 and the condenser unit 24. In particular, the first stopper 40 seals the gap between a top portion of the condenser unit 24 and the bottom of the transmission cooler 22. The first stopper 40 further forms a seal between the condenser unit 24 and the substrate 38.

The second stopper 42 is supported to the substrate 38 at the vehicle rearward side 38B of the substrate 38. As shown in FIGS. 3 and 4, the second stopper 42 contacts the radiator unit 20. As shown in FIG. 5, the second stopper 42 contacts the radiator unit 20 along the vertical length of the radiator unit 20. The second stopper 42 preferably seals the inboard portion 32B of the radiator tank 32 from road liquid from the transmission cooler 22. Therefore, the second stopper 42 preferably contacts the inboard portion 32B of the radiator tank 32 up to the inboard edge of the radiator tank 32.

Figure 9:
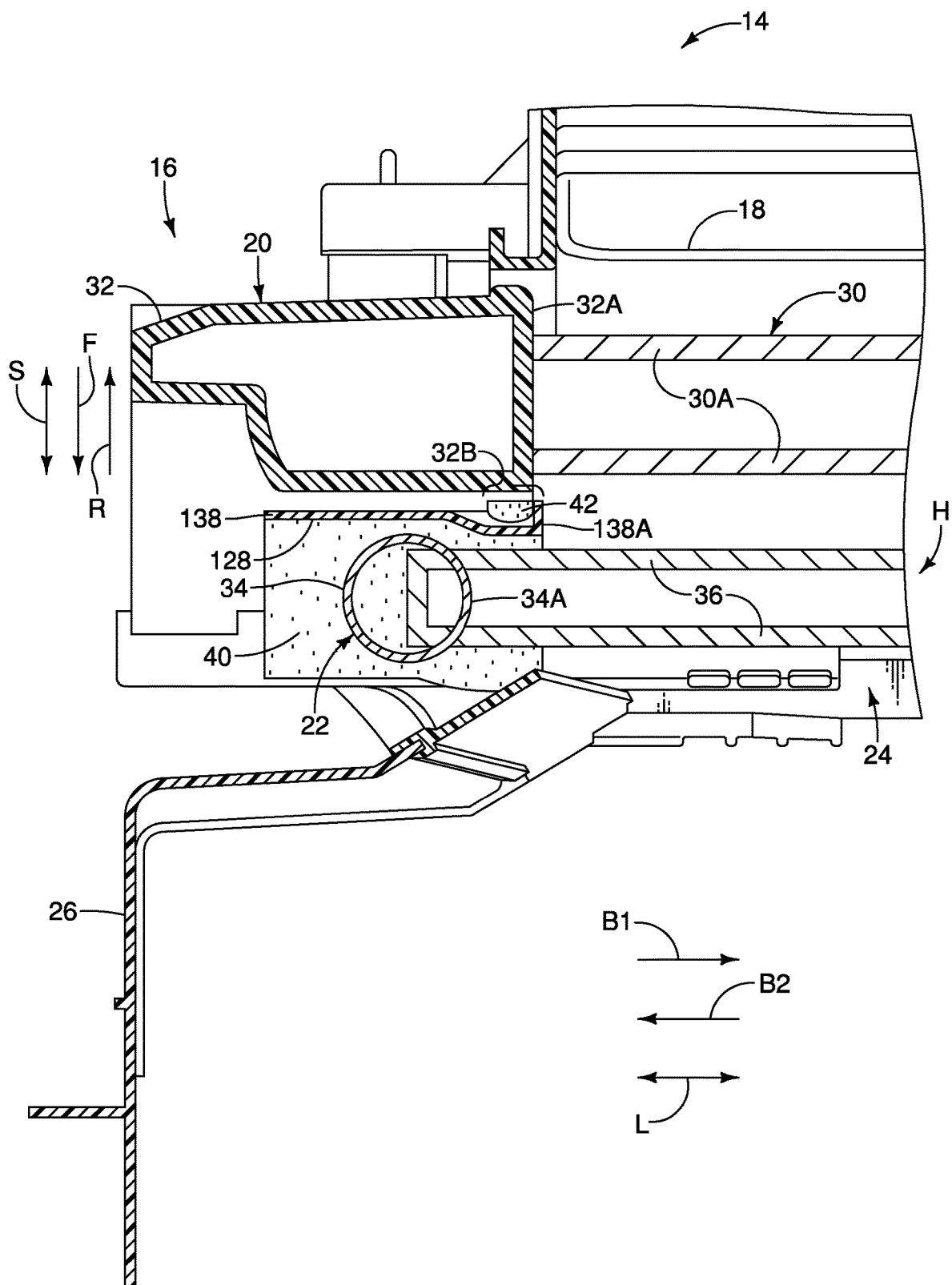
FIG. 9 is a cross-sectional view of the vehicle front end module similar to FIG. 4 but with a modified splash shield assembly.

Referring to FIG. 9, a modified splash shield assembly 128 that can be implemented with the front end module 14 is illustrated. The modified splash shield assembly 128 has a modified substrate 138 and a first stopper 40 and a second stopper 42. Therefore, modified splash shield assembly 128 is identical to the splash shield 28 of FIGS. 1 to 8 except that the substrate 38 has been modified to be the modified substrate 138. The modified substrate 38 has a rearward extending flange 138A that that curves around the second stopper 42 to protect the second stopper 42. The rearward extending flange 138A extends in the vehicle rearward direction with respect to the first stopper 40. The second stopper 42 is positioned adjacent to the rearward extending flange 138A.

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle front end module. Accordingly, these terms, as utilized to describe the present invention should be interpreted relative to a vehicle equipped with the vehicle front end module.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle front end module, comprising:
   a radiator unit;
   a heat exchanger unit disposed in a vehicle forward direction of the radiator unit; and
   a splash shield assembly disposed in the vehicle forward direction of the radiator unit so that the splash shield is located sandwiched between the heat exchanger and radiator unit, the splash shield extending beyond the heat exchanger unit in a heightwise direction.

2. The vehicle front end module according to claim 1, wherein
   the radiator unit has a radiator tank and a radiator core, the radiator tank being located on a lateral side of the radiator core with the splash shield being disposed in the forward direction of the radiator tank, the heat exchanger unit having a heat exchanger tank, the radiator tank and the heat exchanger tank being laterally offset in a vehicle lateral direction with respect to each other.

3. The vehicle front end module according to claim 2, wherein
   the splash shield assembly is supported to the radiator unit at a portion of the radiator unit that is laterally offset of the heat exchanger.

4. The vehicle front end module according to claim 3, wherein
   the heat exchanger unit includes a transmission cooler.

5. The vehicle front end module according to claim 4, wherein
   the transmission cooler includes a cooler tank and a plurality of cooler fins, the splash shield assembly contacting the cooler tank.

6. The vehicle front end module according to claim 5, wherein
   the splash shield assembly does not contact the cooler fins.

7. The vehicle front end module according to claim 1, wherein
   the splash shield assembly includes a substrate that is supported to the radiator unit, and further includes a stopper supported to the substrate, the stopper contacting one of the radiator unit and the heat exchanger unit.

8. The vehicle front end module according to claim 7, wherein
   the stopper is a first stopper and the splash shield assembly further includes a second stopper that is supported to the substrate.

9. The vehicle front end module according to claim 8, wherein
   the first stopper is supported to the substrate at a vehicle forward side of the substrate, the second stopper is supported to the substrate at a vehicle rearward side of the substrate.

10. The vehicle front end module according to claim 9, wherein
    the substrate contacts the radiator unit and the heat exchanger unit.

11. The vehicle front end module according to claim 10, wherein
    the first stopper contacts the heat exchanger unit.

12. The vehicle front end module according to claim 11, wherein
    the second stopper contacts the radiator unit.

13. The vehicle front end module according to claim 11, wherein
    the heat exchanger unit includes a transmission cooler.

14. The vehicle front end module according to claim 13, wherein
    the transmission cooler includes a cooler tank and a plurality of cooler fins, the first stopper contacting the cooler tank.

15. The vehicle front end module according to claim 14, wherein
    the first stopper does not contact the cooler fins.

16. The vehicle front end module according to claim 14, wherein
    the first stopper contacts a bottom of the cooler tank.

17. The vehicle front end module according to claim 9, wherein
    the substrate contacts the radiator unit along a vertical length of the radiator unit.

18. The vehicle front end module according to claim 17, wherein
    the first stopper contacts a bottom of the heat exchanger.

19. The vehicle front end module according to claim 18, wherein
    the second stopper contacts the radiator unit along the vertical length of the radiator unit.

20. The vehicle front end module according to claim 19, wherein
    the substrate includes plastic, the first and second stoppers include foam.

* * * * *